United States Patent [19]
Yoshida

[11] Patent Number: 5,673,274
[45] Date of Patent: Sep. 30, 1997

[54] TEST METHOD FOR SEMICONDUCTOR DEVICE

[75] Inventor: Toshiya Yoshida, Saitama-ken, Japan

[73] Assignee: Kabushiki Kaisha Toshiba, Kawasaki, Japan

[21] Appl. No.: 672,238

[22] Filed: Jun. 28, 1996

Related U.S. Application Data

[63] Continuation of Ser. No. 719,936, Jun. 24, 1991, abandoned.

[30] Foreign Application Priority Data

Jun. 26, 1990 [JP] Japan ................................ 2-165694

[51] Int. Cl.⁶ .................................................. H04B 17/00
[52] U.S. Cl. ................................................. 371/22.1; 371/27
[58] Field of Search ............................ 371/22.1, 22.3, 371/24, 25.1, 27, 22.2

[56] References Cited

U.S. PATENT DOCUMENTS

| 4,856,002 | 8/1989 | Sakashita et al. | 371/21 |
| 4,914,379 | 4/1990 | Maeno | 371/22.3 |
| 4,980,889 | 12/1990 | De Guise et al. | 371/22.3 |
| 5,107,498 | 4/1992 | Hagihara et al. | 371/22.1 |
| 5,142,223 | 8/1992 | Higashino et al. | 371/22.1 |
| 5,144,627 | 9/1992 | Horie et al. | 371/22.1 |
| 5,155,432 | 10/1992 | Mahoney | 371/22.3 |
| 5,161,159 | 11/1992 | McClure et al. | 371/22.1 |
| 5,161,160 | 11/1992 | Yaguchi et al. | 371/22.3 |
| 5,185,745 | 2/1993 | Manca, Jr. | 371/22.1 |
| 5,260,949 | 11/1993 | Hashizume et al. | 371/22.3 |

*Primary Examiner*—Robert W. Beausoliel, Jr.
*Assistant Examiner*—Albert Décady
*Attorney, Agent, or Firm*—Foley & Lardner

[57] ABSTRACT

Disclosed is a test method of a semiconductor device having a processor, a plurality of functional blocks to be tested, and a memory for storing test data used for testing the functional blocks and test results, comprising a step for placing the semiconductor device in a test mode, a step for providing the test data from the memory to the functional blocks under the control of the processor in accordance with programmed instructions, a step for executing the test operation for the functional blocks under the control of the processor in accordance with the programmed instructions, a step for transferring the test results from the functional blocks to the memory under the control of the processor in accordance with the programmed instructions, a step for placing the semiconductor device in a normal operation mode; and a step for analyzing the test results under the control of the processor in accordance with the programmed instructions.

6 Claims, 5 Drawing Sheets

TEST METHOD FOR SEMICONDUCTOR DEVICE

This application is a continuation of application Ser. No. 07/719,936, filed Jun. 24, 1991, now abandoned.

BACKGROUND OF THE INVENTION

1. Field of the Invention

This invention relates to a test method for a semiconductor device comprising a processor and functional blocks.

2. Description of the Prior Art

In conventional system or a device comprising a processor as a control means for operations and a plurality of functional blocks to be tested which are fabricated on a chip as LSI, the test operations for each of the functional blocks are executed.

FIG. 1 is a block diagram of such a conventional system having a processor and a plurality of functional blocks.

In FIG. 1, test data for each functional block B1, . . . , Bn is provided from an external device (not shown) of the system, then the test result is transferred to the external device. The test operation described above is performed for each functional block.

Moreover, control signals 1, . . . , n for controlling the test operations are respectively provided from the external device to each of the functional blocks.

The test operations for each of the functional blocks in the system are explained below.

FIG. 2 shows the timing of the test operations.

First, a control signal 1 is provided to the functional block B1 to cause the functional block B1 to enter a state to be tested. Second, the functional block B1 receives test data from the external device. Finally, the test result is transferred from the functional block B1 to the external device to be analyzed.

Therefore, the test operations for the other functional blocks B2, . . . , Bn are also performed sequentially.

Namely, in the system shown in FIG. 2, the control signals 1, . . . , n and test data are provided to the functional blocks B1, . . . , Bn, respectively and sequentially.

The total test time of the functional blocks B1, . . . , Bn is obtained by the sum of the operation time for each functional block. For example, when each functional block has the same function, the total test time is n times the test time of one functional block.

As the number of the functional blocks is increased, the total test time increases. The test efficiency, therefore, becomes lower because the control signals 1, n are provided to the functional blocks B1, . . . , Bn.

Furthermore, the external device is required for input or output of the test data, the test result and the control signals for each functional block.

For example, when the system is fabricated on a chip, an LSI tester may be used as the external device. In such a case, the cost of the test operations for the system is increased.

FIG. 3 is a block diagram of another conventional system having a processor and a plurality of functional blocks.

In FIG. 3, test data 1, . . . , n and control signal 1, n are provided from the external device to each functional block B1, . . . , Bn, respectively, then the test results 1, . . . , n from each functional block is output to the external device.

The test data 1, . . . , n and the control signals 1, n are provided to the functional blocks B1, . . . , Bn at the same time, the test results from each functional block are provided to the external device corresponding to the completion of the test operation of each functional block. Namely, the test operations for each functional block are performed simultaneously.

Therefore the total test time for the system is determined by the functional block with the longest test time.

For example, the total test time of the system is same as that of one functional block when each functional block has the same function.

In this case, the test time of the system shown in FIG. 3 is shorter than that of the system as shown in FIG. 1. However, the amount of required test data, the number of control signals, and the amount of test results must be increased as shown in FIG. 3.

Moreover, the external device must also be provided as the LSI tester for the test operation of the system.

SUMMARY OF THE INVENTION

This invention is provided to resolve the problems in the prior art described above.

An object of this invention is to provide a test method for a semiconductor device which is capable of efficiently executing test operations and of decreasing test time without increasing the number of components in the device.

To achieve the object, a test method of a semiconductor device having a processor, a functional block to be tested, and a memory or a register for storing test data and test results, comprises a step for causing the semiconductor device to enter a test mode, a step for providing the test data from the memory or the register to the functional blocks under the control of the processor in accordance with programmed instructions, a step for executing the test operation for the functional blocks under the control of the processor in accordance with the programmed instructions, a step for transferring the test result from the functional blocks to the memory or the register under the control of the processor in accordance with the programmed instructions, a step for causing the semiconductor device to enter a normal operation mode, and a step for analyzing the test results under the control of the processor in accordance with the programmed instructions.

A semiconductor device with a test circuit, according to the present invention comprises a processor as a control means for testing the semiconductor device, which comprises a register for storing test data, a plurality of functional blocks, each comprising a logical circuit to be tested, a first memory or a register for storing the test data and a second memory or a register for storing the test results, and a data bus for connecting the processor and each functional block for transferring the test data, the test results and control register required for the test, wherein the processor is controlled by programmed instructions.

As described above, test data is provided to each functional block under the control of programmed instructions (which may be programmed by using some software tools, such as in a normal operation) executed by a processor incorporated in the system including the functional blocks, then a test result is transferred to the processor to be analyzed.

The object, features and advantages of the present invention will be more apparent from the following description of preferred embodiments, taken in conjunction with the accompanying drawings.

DETAILED DESCRIPTION OF THE EMBODIMENTS

The preferred embodiments according to the present invention will be explained with reference to the drawings.

Figure 1:
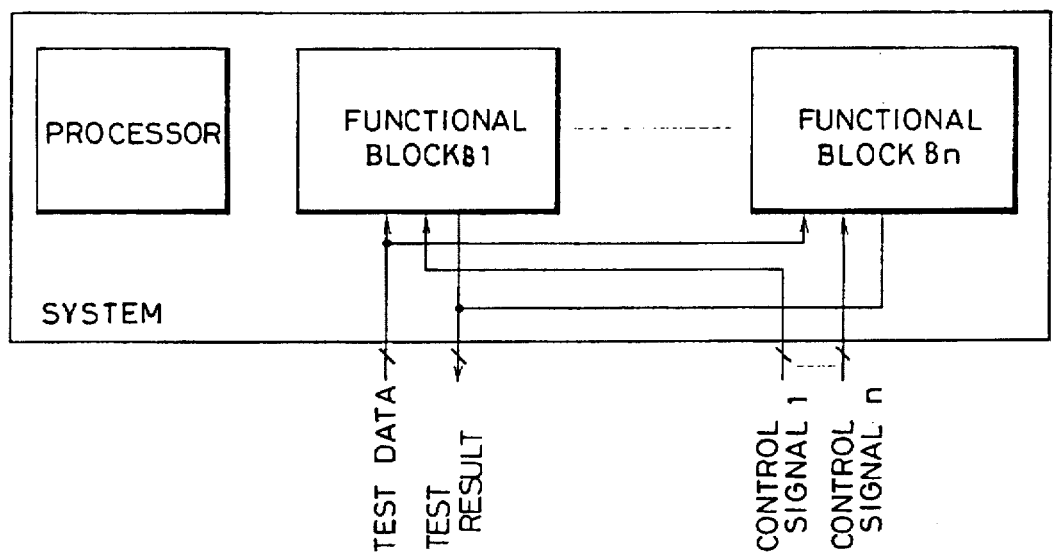
FIG. 1 is a block diagram of a conventional system having a processor and a plurality of functional blocks.
Figure 2:
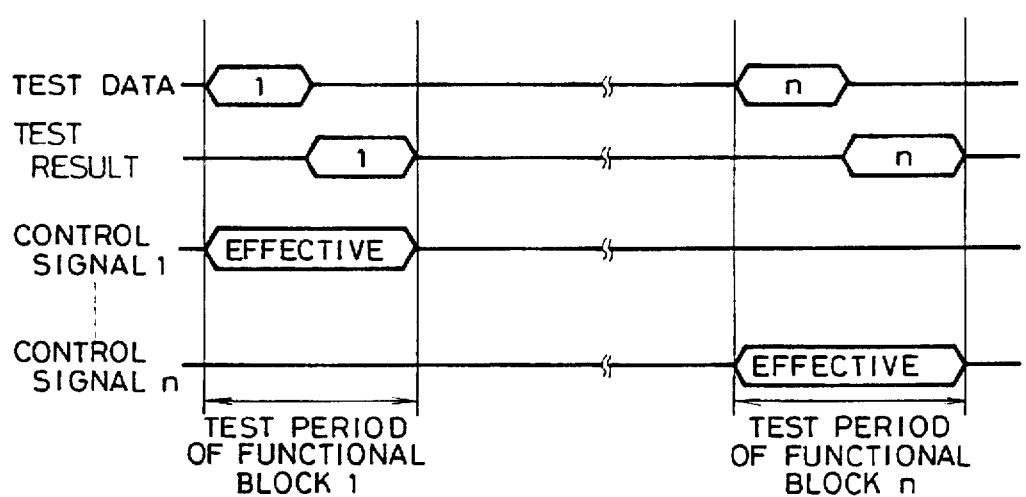
FIG. 2 is a timing chart for the semiconductor device as shown in FIG. 1.
Figure 3:
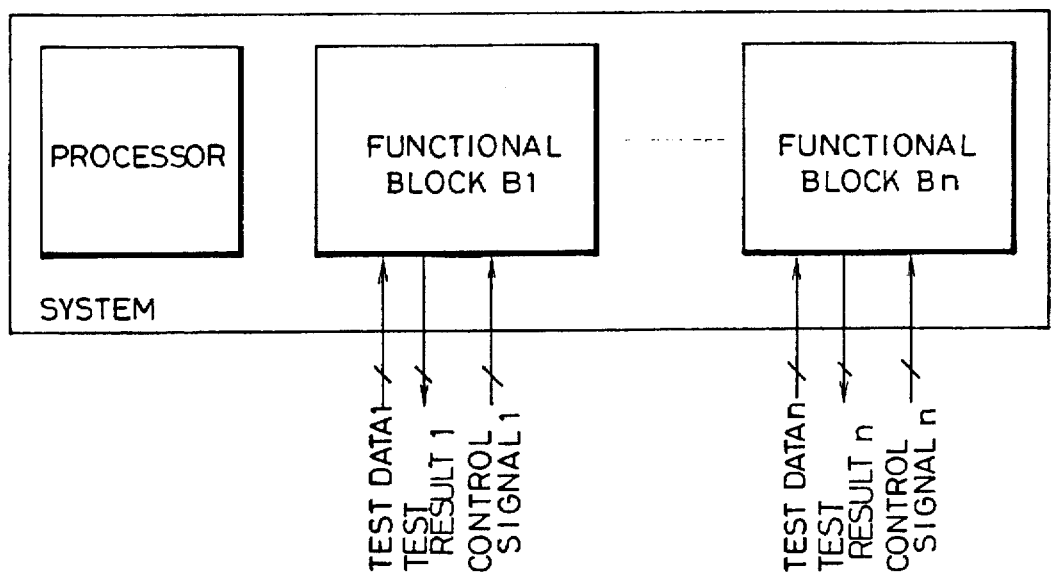
FIG. 3 is a block diagram of another conventional system having a processor and a plurality of functional blocks.
Figure 4:
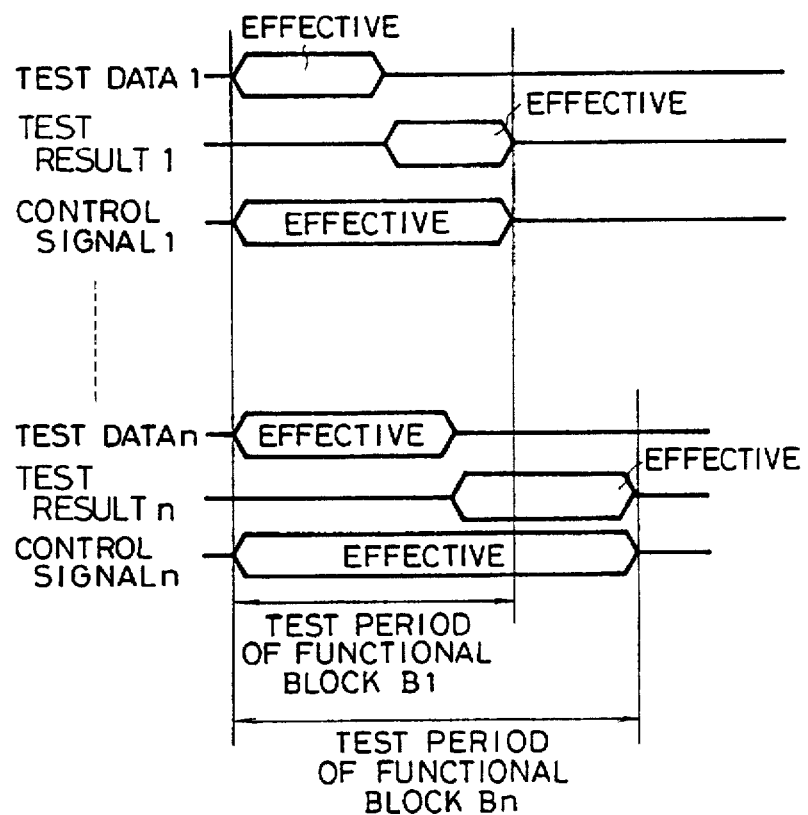
FIG. 4 is a timing chart for the semiconductor device shown in FIG. 3.
Figure 5:
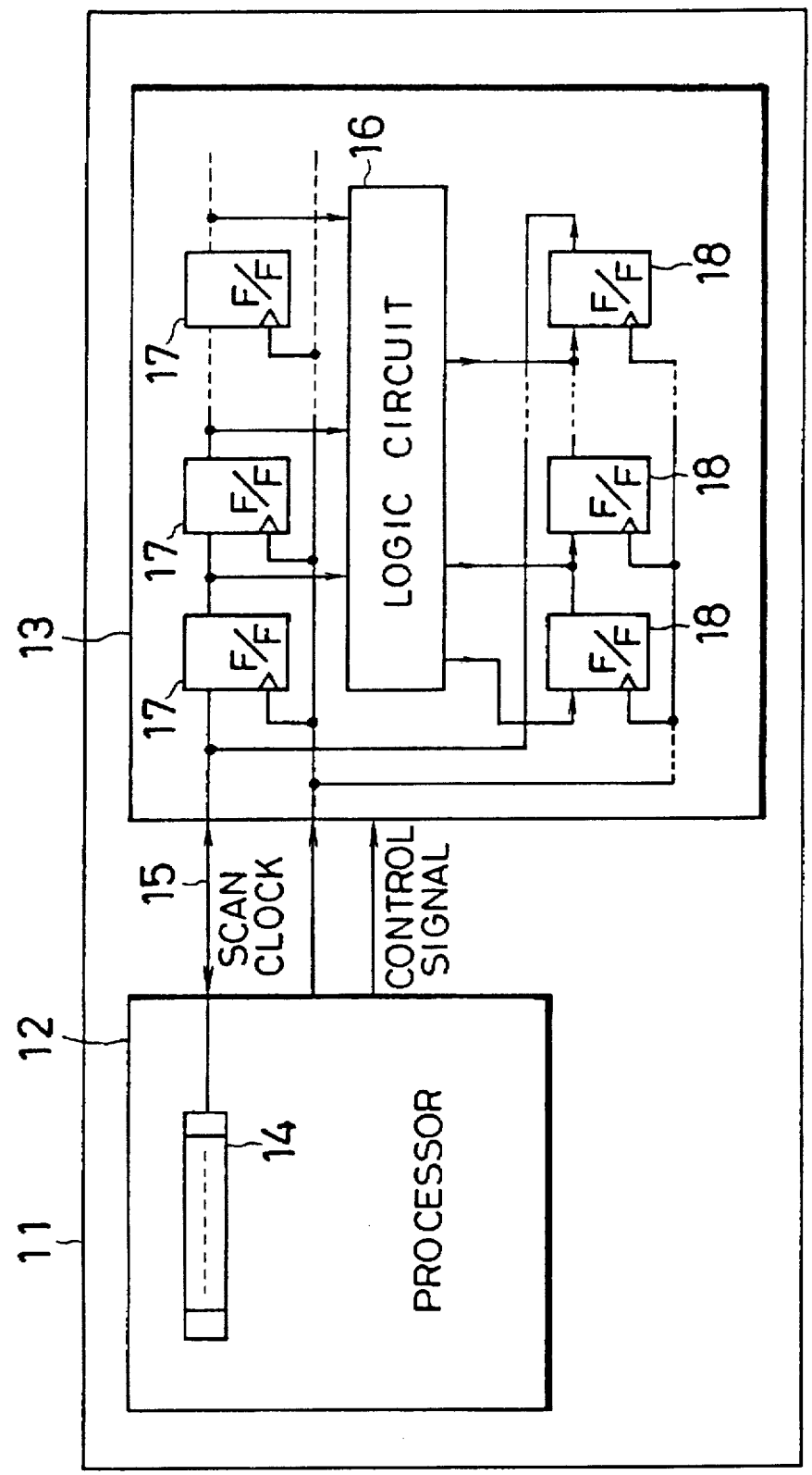
FIG. 5 is a block diagram of a semiconductor device as a system of a first embodiment according to the present invention.

FIG. 5 is a block diagram of a semiconductor device as a system of a first embodiment according to the present invention.

In the same diagram, there are a processor 12 as a control means for test operations of the system 11 and a functional block 13. The processor 12 controls test operations for the functional block 13 by a scan-path test method.

There are two operation modes in the system, a normal operation mode and a test operation mode or a scan test operation mode. In the normal operation mode, the system 11 is processed normally and in the scan test operation mode, the test operations of the system 11 are operated for the functional blocks.

Namely, the system comprises the processor 12 as the control means and the functional block 13. The processor 12 can control the normal operation and the test operation in the system 11. The functional block 13 performs its predetermined function in accordance with instructions programmed by using a software tool (which also is used in the normal operation mode) transferred to the processor 12.

In the scan test operation mode, the processor 12 controls the test operations of the functional block 13 by using the programmed instructions.

The control signals are used for indicating the normal operation mode or the test operation mode in synchronization with a scan clock signal.

Moreover, the processor 12 comprises a register 14 which is capable of serially inputting and outputting test data by shift-in and shift-out operations.

The test data and the resultant test data (which is called "scan test data") of the test operations are stored in the register 14.

The scan test data is transferred between the processor 12 and the functional block 13 through a scan data input/output line 15.

The transfer direction of the scan test data transferred on the scan data input/output line 15 is switched under the control of the processor 12.

In the system of the embodiment, both the test data and the resultant test data are stored in the register 14, but these two types of test data may be stored in different registers, respectively.

A shift instruction executed by the processor 12 enables two shift operations, one of which is operated in the register 14 in the scan test operation mode, while the other shift operation shifts data transferred from a memory (not shown) in parallel in the normal operation mode. Accordingly, to shift the scan data stored in the register 14, two different instructions, one for the normal operation mode and one for the scan test operation mode must be provided to the processor 12.

For distinguishing between the two shift operations described above, a flip flop (F/F) controlled by the software must be incorporated in the processor 12 so that the processor 12 is controlled by a new shift instruction by which the data in the register 14 can be shifted must be added.

The functional block 13 comprises a logic circuit 18 which is the object of the test operation, a plurality of F/Fs 17 in which the test data is stored, and a plurality of F/Fs 18 in which the data resulting from the test operations is stored.

The logic circuit 16 is operated in accordance with the test data provided from the F/Fs 17, then transfers the data resulting data from the test operations to the F/Fs 18.

The F/Fs 17 input the test data provided from the processor 12 in synchronization with the scan clock signal by the shift-in operation, then provide this data to the logic circuit 16.

The F/Fs 18 input the resultant data from the logic circuit 16, then provide this data to the processor 12 in synchronization with the scan clock signal sequentially.

In the device having the configuration described above, when the test of the function block 13 is carried out, the control signal indicating the scan test operation mode is provided from the processor 12 to the function block 13 first, then a logical right shift instruction by which the test data is shifted to the right by a predetermined number of bits is performed at the processor 12.

Figure 6:
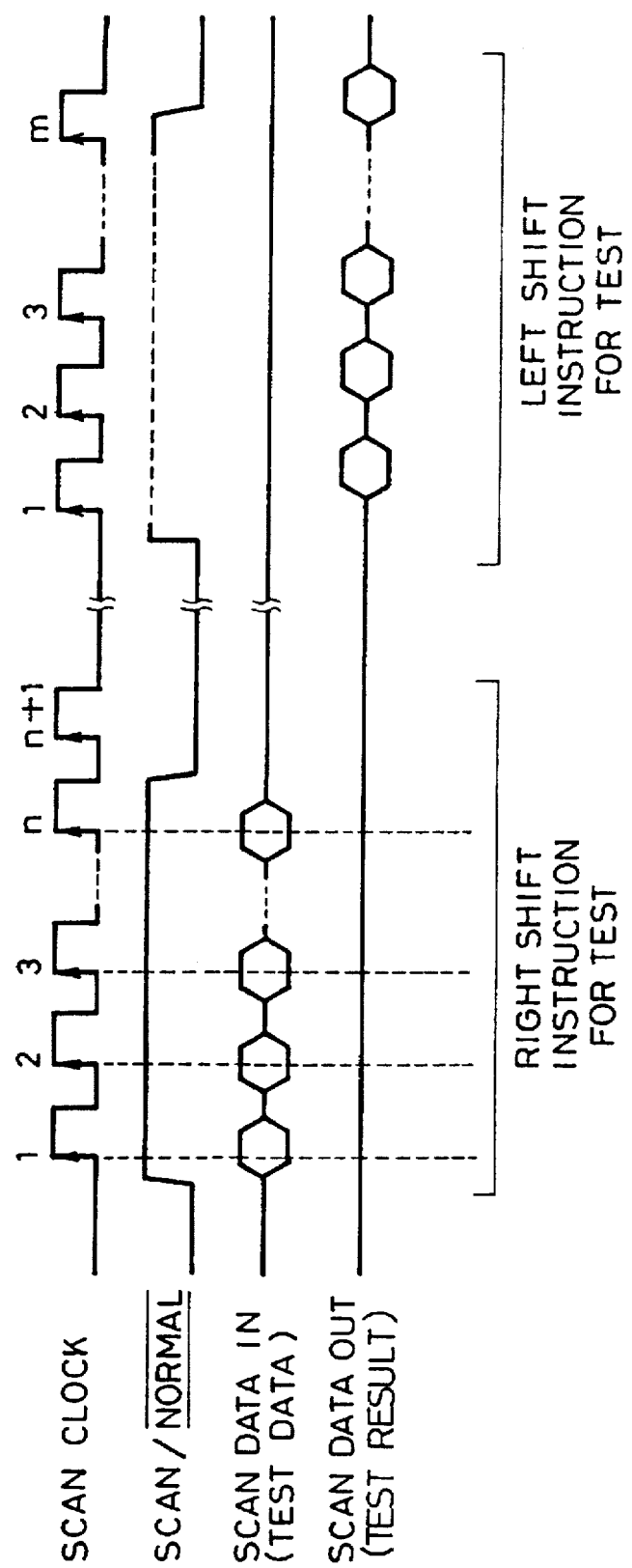
FIG. 6 is a timing chart for the semiconductor device shown in FIG. 5.

Thereby, as shown in FIG. 6, the test data in the register 14 is provided to the function block 13 through the scan data input/output line 15, then stored in the F/Fs 17 in synchronization with the scan clock signal after it is shifted by the predetermined number of bits designated by the logical right shift instruction.

Next, the control signal indicating the normal operation mode is provided from the processor 12 and the scan clock signal (n+1) is provided to the function block 13.

Thereby, the test data in the F/Fs 17 is provided to the logic circuit 16, and the normal operation of the logic block 16 is operated by one clock signal (n+1).

When a logical left shift instruction by which the resultant data from the test operations is shifted to the left by a predetermined number of bits is performed by the processor 12 after the completion of the normal operation, the control signal indicating that the processor 12 enters the scan operation mode and the scan clock signal is provided to the function block 13.

Thereby, the resultant data from the logic circuit 16 is shifted, then provided to the F/Fs 18 in synchronization with the scan clock signal as shown in FIG. 6. Next, the resultant data in the F/Fs 18 is provided to the register 14 in the processor 12 through the scan data input/output line 15, then the system enters the normal operation mode and the left shifting operation by the logical left shifting instruction is completed because no scan clock signal is provided to the function block 13.

Finally, the resultant test data stored in the register 14 is analyzed by a comparison instruction by which the resultant data is compared with predetermined expected data.

In the test operations for the system of the embodiment, the processor can control the input/output operation of the test data and the control signals as control data required for the test operations, and the output operations and the analysis of the resultant data of the test operations by using the programmed instructions described above without an external test device such as a LSI tester so long as the processor can operate correctly.

Therefore the test operations can be operated in a short time and no additional components for the test operations are required for the device of the embodiment.

Moreover, addition, modification, and elimination of test data can be easily executed because various software tools can be applied to the test operations of the device of the embodiment.

Accordingly, test operations can be carried out efficiently, so that the development period for a semiconductor device can be decreased.

In the semiconductor device of the above embodiment, there is only one functional block 13, but this invention is not limited to the embodiment. This invention can be applied to a semiconductor device having a plurality of functional blocks. In such a case, scan data is sent to the functional blocks simultaneously in synchronization with a scan control signal, then the resultant test data transferred from each functional block may be independently stored and analyzed.

Moreover, a logical sum of the resultant test data can be used for the analytical operation of the resultant test data transferred from the functional blocks which have the same function.

Figure 7:
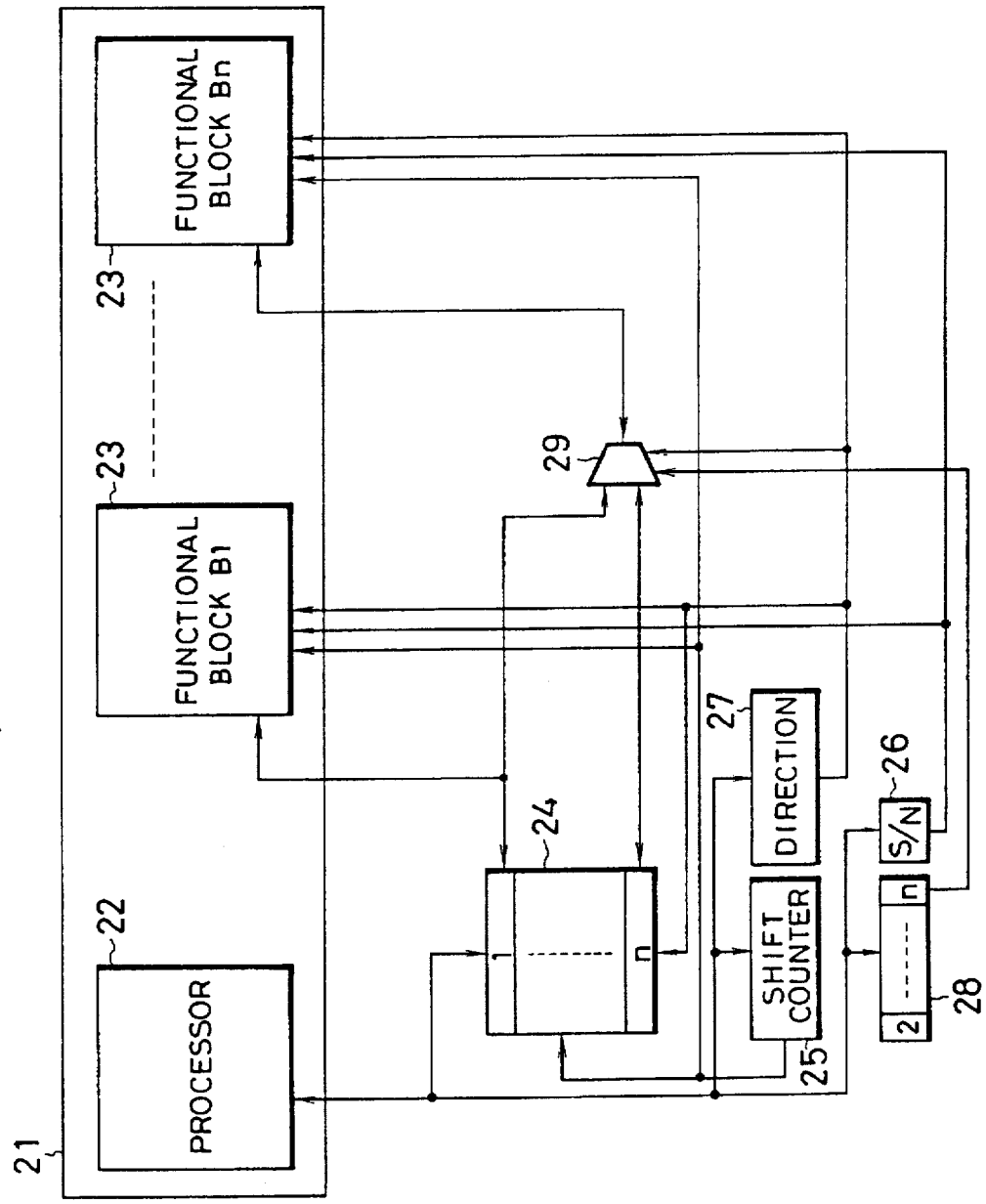
FIG. 7 is a configuration of a semiconductor device of another embodiment according to the present invention.

FIG. 7 is a configuration of a semiconductor device of another embodiment according to the present invention.

In the embodiment, a test data storage means, a control data storage means, a resultant data storage means, and a control signal generating means are provided at external portions of a processor 22, which will be described below in detail.

In the same diagram, a semiconductor device 21 as a system comprises the processor 22 and a plurality of functional blocks 23.

A register 24 for storing the test data and the resultant data, a shift counter 25 for generating a scan clock signal, a register 26 for storing data indicating either a scan test operation mode or a normal operation mode, a register 27 for storing data indicating a transfer direction for data in the functional blocks 23, and a register 28 for storing data selecting the scan data are installed in the external portions of the system 21.

The required data is transferred to the registers 24, 28, 27, and 28 in accordance with a transfer instruction under the control of the processor 22.

In the device having the configuration described above, when a test operation for the functional blocks 23, is performed a data transfer instruction is executed by the processor 22, then the required test data is transferred to the register 24, data indicating the required scan data is entered into the register 28, data indicating the scan operation mode is stored in the register 26, data indicating the number of the scan clock signals is entered into the shift counter 25, and test data to be provided to the functional blocks 23 is entered into the register 24 Next, the scan clock signals according to the data in the register 27 indicating the number of the scan clock signals are generated, then provided to the register 24 and the functional blocks 23.

Thereby, the data in the register is transferred to the functional blocks 23. At the same time, for example, the test data which is selected by the selector 29 based on the data in the register 28 is provided to the first through the n-th functional block 23, the control signal indicating the normal operation mode is provided to the register 26, one scan clock signal is generated, and each of the first through n-th functional blocks 23 is operated in accordance with the provided test data.

Next the data transfer instruction is executed by the processor 22 to transfer the data for indicating the scan data to the register 28 and the data indicating the scan operation mode is provided to the register 26, and the number of scan clock signals to be generated is entered into the shift counter 25. Thereby, the resultant test data transferred from the functional blocks 23 is stored in the register 24. The resultant test data in the register 24 is then read out to the processor 22 to be analyzed. In this manner, the test operations for the semiconductor device are completed.

The test operation of the semiconductor device of present embodiment can obtain the same effect as the test operation by the device shown in FIG. 5.

In the present embodiment, the test data and the resultant test data are stored in the same register 24, but this invention is not limited by the configuration of the semiconductor device described above. For example, the different test data can be stored in different registers, respectively to obtain the same effect.

Moreover, a register corresponding to each functional block 23 can be provided for the input/output operations between the functional blocks 23 and the register 24, so that any area in the register 24 can be selected for the input and output operations of data in functional block 23.

Furthermore, the shift counter 25 and the register 27 can be installed for each functional block 23. In this case, the test operation can be operated more efficiently because the scan operations for the functional blocks 23 can be operated in parallel.

Various modifications will become possible for those skilled in the art after the teaching of the present disclosure without departing from the scope thereof.

What is claimed is:

1. A test method of a single chip LSI device having a processor, a plurality of functional blocks to be tested, and a memory (or register) for storing test data and test results, comprising:

a step for causing the LSI device to enter a test mode from a normal operation mode;

a step for providing the test data from the memory to the functional blocks under the control of the processor in accordance with instructions programmed by using an instruction set of the processor;

a step for executing the test operation for the functional blocks under the control of the processor in accordance with the instructions programmed by using the instruction set of the processor;

a step for transferring the test results from the functional blocks to the memory under the control of the processor in accordance with the instructions programmed by using the instruction set of the processor;

a step for causing the LSI device to reenter the normal operation mode; and a step for analyzing the test results, while in the normal operation mode, under the control of the processor in accordance with the programmed instructions programmed by using the instruction set of the processor.

2. A test method according to claim 1, wherein in the steps for providing the test data and for transferring the test results, the test data and the test results are transferred through a data bus in parallel under the control of the processor in accordance with the instructions programmed by using the instruction set of the processor.

3. A test method according to claim 1, wherein in the steps for providing the test data and for transferring the test results, the test data and the test results are transferred to each functional block independently.

4. A test method according to claim 1, wherein in the steps for providing the test data and for transferring the test results, the memory inputs and outputs the data and the test results in series.

5. A semiconductor device with a test circuit comprising:

a processor providing a control function for the testing of the semiconductor device;

a test data storage area, connected to said processor, said test data storage area storing input test data and test result data;

a plurality of functional blocks, each of said functional blocks including,
 a logical circuit to be tested,
 a first storage area on an input side of said logical circuit, said first storage area storing said input test data,
 a second storage area on an output side of said logical circuit, said second storage area storing said test result data;

a selector connected between said test data storage area and said functional blocks and receiving multiple inputs from said test data storage area;

a shift counter containing the number of scan clock signals to be generated, connected to said plurality of functional blocks, said test data storage area and said processor;

a transfer register connected to said selector, said functional blocks and said processor, said transfer register storing data indicating transfer direction of test data into or out of said functional blocks;

a mode register connected to said functional blocks and said processor, said mode register storing data indicating a scan operation mode or a normal operation mode, said mode register being loaded by said processor; and a select register connected to said selector, said test data storage area and said processor, said select register storing data selecting test data from said test data storage area to be provided through said selector to said functional blocks, and wherein said test data storage area, said shift counter, said transfer register and said select register are accessed by instructions programmed by using instructions of an instruction set of said processor to control testing.

6. A method of testing a semiconductor device with a test circuit, with a processor providing test control, the method comprising the steps of:

loading input test data into a test data storage area from said processor based on instructions programmed by using instructions of an instruction set of the processor;

loading a transfer register from said processor with data indicating that a transfer direction of test data is into a functional block to be tested based on instructions programmed by using instructions of the instruction set of the processor;

loading a mode register from said processor with data indicating a scan operation mode based on instructions programmed by using instructions of the instruction set of the processor;

loading a select register from said processor, with data indicating which data from said test data storage area is to be provided through said selector to said functional block based on instructions programmed by using instructions of the instruction set of the processor;

loading a shift counter from said processor with data indicating the number of scan clock signals to be generated based on instructions programmed by using instructions of the instruction set of the processor;

scanning input test data, selected according to said select register, from said test data storage area into a first storage area on an input side of a logical circuit to be tested in said functional block based on instructions programmed by using instructions of the instruction set of the processor;

loading said mode register, from said processor, with data indicating a normal operation mode based on instructions programmed by using instructions of the instruction set of the processor;

generating one scan clock signal in normal operation mode based on instructions programmed by using instructions of the instruction set of the processor;

reloading said transfer register from said processor with data indicating that the transfer direction of test data is out of said functional block based on instructions programmed by using instructions of the instruction set of the processor;

reloading said mode register, from said processor, with data indicating a scan operation mode based on instructions programmed by using instructions of the instruction set of the processor;

scanning test result data, from a second storage area on an output side of said logical circuit, into said test data storage area based on instructions programmed by using instructions of the instruction set of the processor; and analyzing said test result data in said test data storage area by said processor based on instructions programmed by using instructions of the instruction set of the processor.

* * * * *